United States Patent [19]

Nojiri et al.

[11] 4,114,030
[45] Sep. 12, 1978

[54] METHOD AND APPARATUS TO OPTICALLY RECOGNIZE RECORDED INFORMATION

[75] Inventors: Tadao Nojiri, Kariya; Akio Sugiura, Nagoya; Masahiro Nomura, Kariya, all of Japan

[73] Assignee: Nippondenso Co., Ltd., Kariya, Japan

[21] Appl. No.: 756,699

[22] Filed: Jan. 4, 1977

[30] Foreign Application Priority Data

Jan. 28, 1976 [JP] Japan .................................... 51-8163

[51] Int. Cl.$^2$ .......................... G06K 7/10; G06K 9/00
[52] U.S. Cl. ................................. 235/464; 235/470; 340/146.3 AG
[58] Field of Search ............... 250/569, 566, 568; 235/61.11 E, 61.7 B, 463, 466, 470; 340/146.3 AG

[56] References Cited

U.S. PATENT DOCUMENTS

| | | | |
|---|---|---|---|
| 3,599,151 | 8/1971 | Harr | 340/146.3 AG |
| 3,628,031 | 12/1971 | Azure | 250/569 |
| 3,849,632 | 11/1974 | Eckert | 235/61.11 E |
| 3,909,594 | 9/1975 | Allais | 235/61.11 E |
| 3,927,303 | 12/1975 | Wefers | 235/61.11 E |

Primary Examiner—Robert M. Kilgore
Attorney, Agent, or Firm—Cushman, Darby & Cushman

[57] ABSTRACT

A light source and a light responsive sensor are optically coupled to recognize information such as bar codes recorded on an object. The light source projects illumination light onto the object and the sensor receives the reflected light the density of which represents the recorded information. The sensor is swept to convert the light density into an image signal which is then passed through a filter. An image signal, the low frequency noise signal component resulting from the fluctuation of the illumination light being excluded therefrom by the filter, is available for recognizing the recorded information precisely.

8 Claims, 6 Drawing Figures

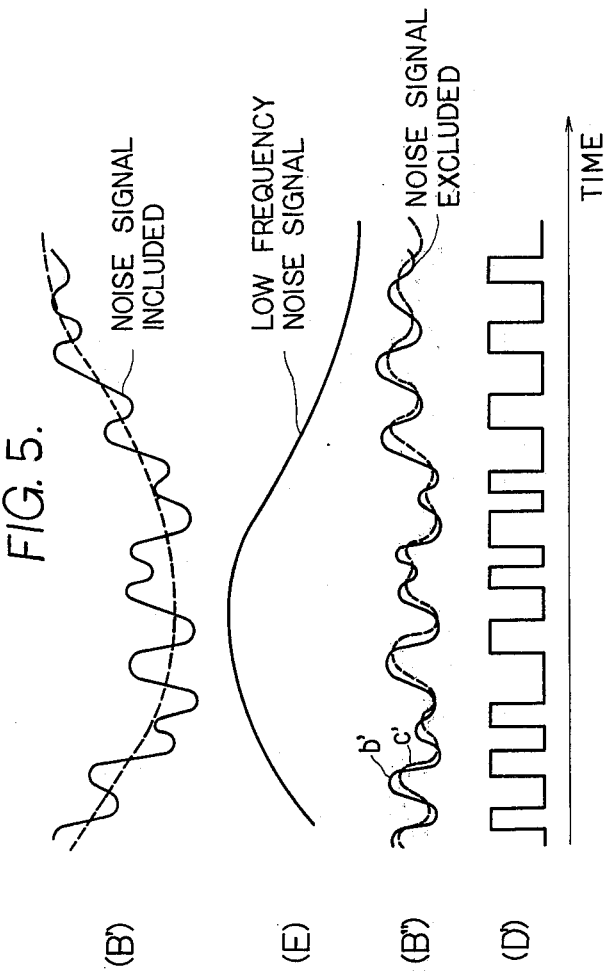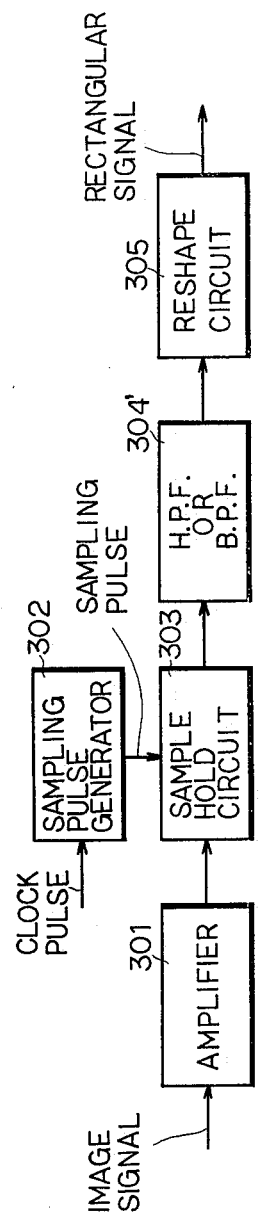

METHOD AND APPARATUS TO OPTICALLY RECOGNIZE RECORDED INFORMATION

BACKGROUND OF THE INVENTION

1. Field of the Invention

The present invention relates to a method and apparatus to optically recognize recorded information and more particularly to one in which an image signal derived from the scanning of information is filtered for the precise recognition of information.

2. Description of the Prior Art

Information encoding and decoding techniques are well known in the art. According to one of these techniques, the information is recorded on an object in the bar code form, for example, to be optically recognized. An illumination light and a light responsive sensor are arranged in this optical recognition system in such a manner that the former projects the light onto the object and the latter receives the reflected light from the object to generate an image signal which represents the recorded information. This image signal is then processed electrically for recognizing the recorded information. It has been a great disadvantage, however, that the light responsive sensor is likely to generate an image signal which includes a periodic noise signal when the light source is energized by a commercial alternating current electric power of rather low frequency. This is because the illumination light from the light source fluctuates in accordance with the electric power and the density of the reflected light also fluctuates in accordance therewith. This disadvantage still occurs when the object is supplied with the light from other than the light source.

SUMMARY OF THE INVENTION

It is, therefore, a primary object of the invention to exclude the noise signal of an image signal derived from a light responsive sensor.

It is another object of the invention to use a filter for cutting off a noise signal of an image signal.

It is a further object of the invention to use a low pass filter for negatively feeding back the noise signal of an image signal during the processing thereof.

BRIEF DESCRIPTION OF THE DRAWINGS

In the accompanying drawings:

FIG. 5 is a chart illustrating signal waveforms for explanation of the noise signal filtering operation of the analog amplifier shown in FIG. 3; and FIG. 6 is a schematic diagram illustrating the modified construction of the analog amplifier shown in FIG. 1.

DESCRIPTION OF THE PREFERRED EMBODIMENT

Figure 1:
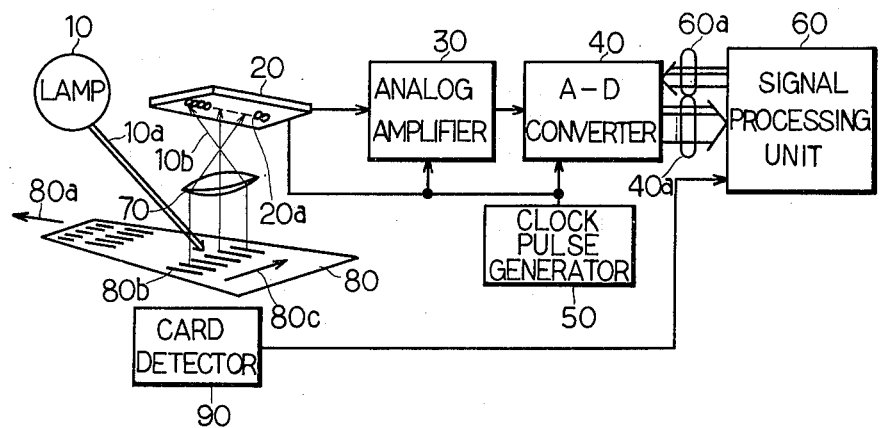
FIG. 1 is a schematic diagram illustrating one embodiment of the present invention.

Referring first to FIG. 1, a light source 10 such as a reflector lamp which is energized by the commerical alternating current (a.c.) electric power is employed to uniformly supply an illumination light 10a over an object, a card 80. An image sensor 20 such as a light responsive solid image sensor having a photo diode array 20a comprising a plurality of photo diodes aligned on a straight read-in line receives the image or the reflected light 10b from the card 80. Each photo diode of the diode array 20a is swept in sequence upon receipt of a clock pulse of a fixed frequency from a clock pulse generator 50 and generates an image signal, the signal level of which corresponds to the density of the reflected light 10b. The image sensor 20 is connected to an analog amplifier 30 for reshaping the image signal into a serial rectangular signal and the analog amplifier 30 is connected to an analog-to-digital converter 40 for converting the serial rectangular signal into a parallel digital signal. The clock pulse generator 50 is connected to the amplifier 30 and the converter 40 to control the respective operation thereof. Connected to the A-D converter 40 is a signal processing unit 60 such as a micro processor to recognize scanned information represented by the digital signals of plural bits in accordance with a predetermined digital processing program. The plural bits of digital signals produced in parallel with each other are transmitted to the unit 60 via transmission lines 40a, whereas completion signals indicative of the completion of the information recognition are oppositely transmitted via transmission lines 60a. A lens 70 is operatively coupled to the image sensor 20 and provides the image sensor 20, diode array 20a thereof in particular, with the image after converging the reflected light 10b. On the surface of the card 80 are printed information to be optically scanned. According to the embodiment of the present invention, the information is coded into bar codes which are grouped into several columns which are parallel to each other. Each bar symbol 80b of the bar codes is arranged to extend in parallel with a card transferring direction denoted by an arrow 80a. The card transferring direction 80a is approximately orthogonal to the read-in line of the image sensor 20 which is parallel with the arrow 80c. The card 80 may be transferred either manually or automatically. A light responsive card detector 90 is also connected to the signal processing unit 60 to detect presence of the card 80 transferred thereof. When the card 80 moves beneath the read-in line of the sensor 20, the illumination light 10a which has been received by the card detector 90 is cut off by the card 80 and reflected onto the image sensor 20. When the card detector 90 stops receiving the illumination light 10a, it generates a card detection signal to be applied as card information to the unit 60.

Figure 2:
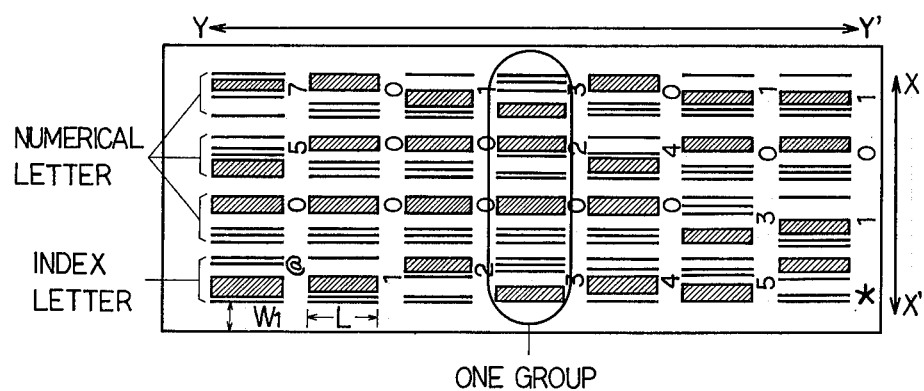
FIG. 2 is an enlarged top plan view of the information recorded on an object shown in FIG. 1.

Bar-coded information on the card 80 according to this embodiment is shown in FIG. 2. Each bar symbol is recorded in black and white which have different light reflectivity and in wide and narrow width. Thus combined four kinds of bar symbols have a unit length L. Each bar code (one letter or one digit) consists of two wide bar symbols and five narrow bar symbols determined by four black bar symbols and three white bar symbols therebetween. Thus one letter is derived from "2 OUT OF 7 COMBINATIONS" in which two wide bar symbols in black and in white among a total of seven bar symbols are used. Further, the bar width N and W of the respective narrow and wide bar symbols are determined to satisfy the relationship W=2.5N therebetween. Thus, the total width 10N (5N+2W) is alloted for each letter on the card 80, and the same width W as the wide bar symbol is alloted between adjacent two letters. A group of bar codes are aligned in a column (X-X' direction) parallel to the above read-in line of the image sensor 20 to constitute a 4-digit letter comprising an index letter and three numerical letters. Each group of bar codes in each column is juxtaposed with its head and tail lining up in a direction (Y-Y' direction) which coincides with the card transferring direction 80a. And at the marginal portions, white spaces of the width $W_1$ are formed as record prohibition regions. The width $W_1$ is arranged to be wider than 6N. It must be noted that the specific index letters and * excluded from the above-described "2 OUT OF 7 COMBINATIONS" are used respectively in the first and the last groups so that the encoded information of the card may not be erroneously read in when the card is transferred in the opposite direction. Thus, the bar coded information having seven groups in rows includes letter information of twenty-one digits per card.

According to the embodiment of FIG. 1 in which information is encoded as shown in FIG. 2, each bar code is scanned in the following manner. While the card 80 is transferred to be supplied with the uniform light 10a, the image sensor 20 receives the light 10b which is reflected by the card 80 and converged by the lens 70. It should be understood that the density of the light 10b corresponds to the color of the bar symbol. The image sensor 20 includes many photo diodes which are swept one by one by the clock pulses. The sensor 20 is so adapted that 4 diodes and 10 diodes of the diode array 20a are used to scan the respective narrow and wide bars. Upon receipt of a clock pulse, each diode senses the light density of the light 10b and generates the image signal. This image signal which is intermittent becomes high level when the density of the light 10b corresponds to the white bar, whereas it becomes low level when the density of the light 10b corresponds to the black bar. And 4 bits and 10 bits of the image signal correspond to the respective narrow and wide bars. It must be understood that 1 bit of the image signal is equal to one cycle of the clock pulse of the clock pulse generator 50. Since the diode array 20a is repetitively swept by the clock pulse, the bar codes in each group can be repetitively scanned at the different tracks on the card 80 while the card 80 is transferred. The scanning repetition number per one group is determined by the card transferring speed and the bar length L. Hundreds of scanning repetition for one group can be attained, provided that the bar length L is 10 millimeters, the transferring speed is 10 millimeters per second, the clock frequency is 280 KHz and the diode array 20a has 512 diodes.

Figure 3:
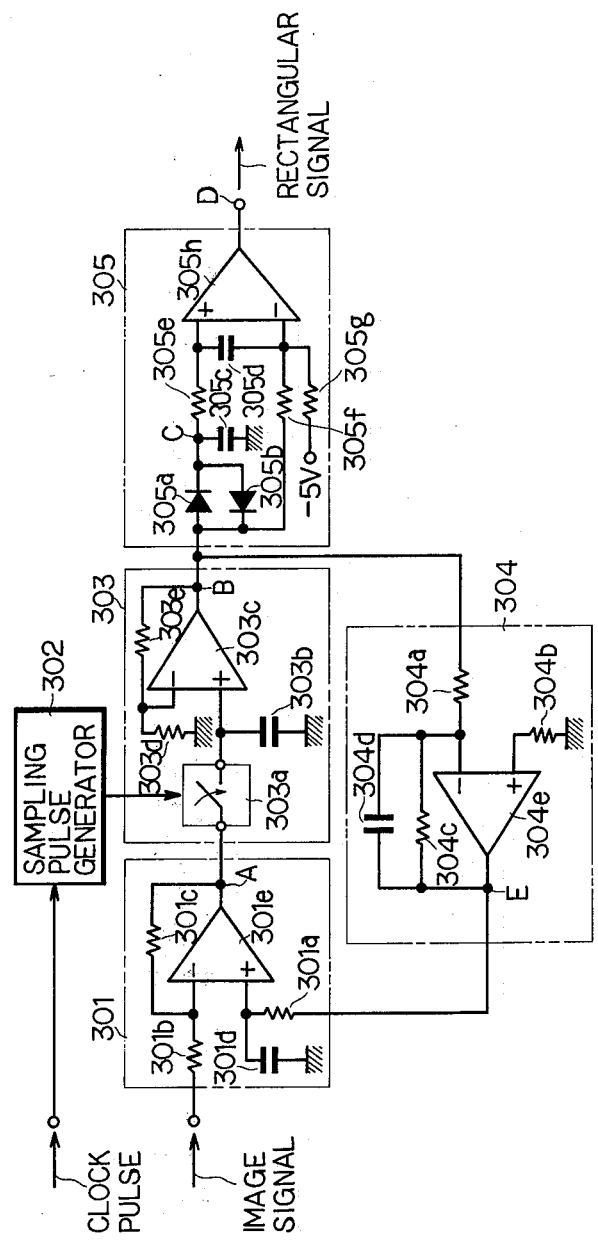
FIG. 3 is an electric wiring diagram illustrating the detail circuit construction of the analog amplifier shown in FIG. 1.
Figure 4:
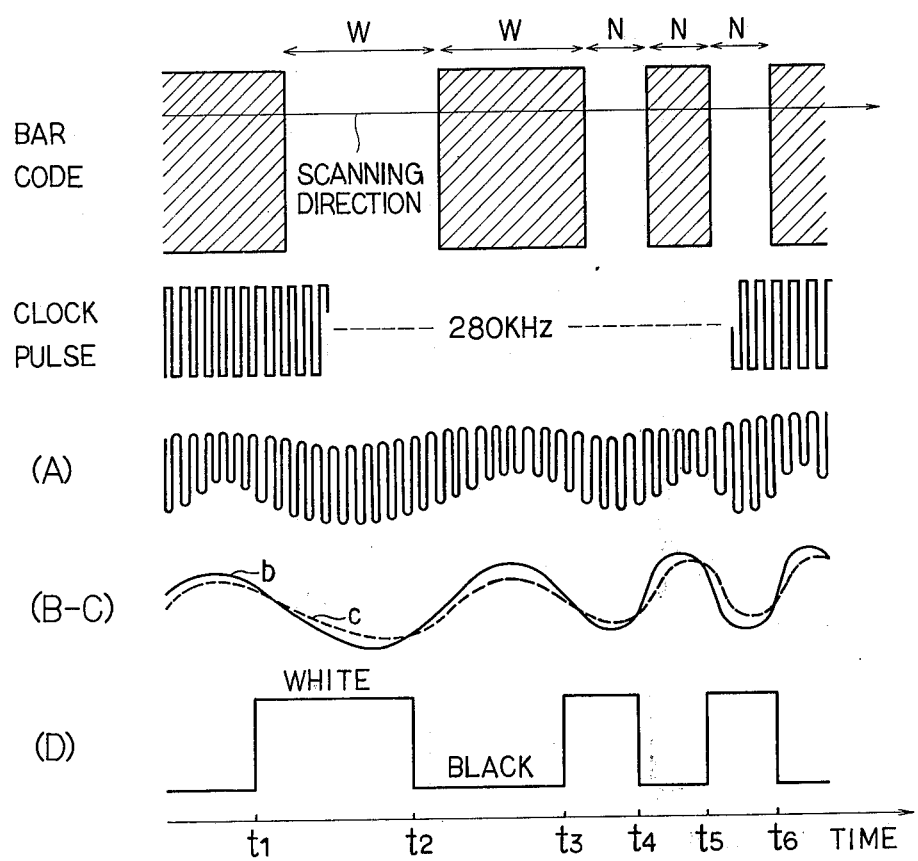
FIG. 4, including 4A–4D, is a chart illustrating signal waveforms in conjunction with a bar code for explanation of the normal operation of the analog amplifier shown in FIG. 3.

The image signal generated intermittently from the image sensor 20 is serially applied to the analog amplifier 30 fully illustrated in FIG. 3, wherein reference numerals 301, 302, 303, 304 and 305 designate an amplifier, a sampling pulse generator, a sample hold circuit, a low pass filter and a reshape circuit, respectively. The amplifier 301 connected to the image sensor 20 is comprised of resistors 301a, 301b and 301c, a capacitor 301d and an operational amplifier 301e. The image signal is applied to the operational amplifier 301e through the resistor 301b to be differentially amplified thereby. The output signal of the amplifier 301, appearing at a point A, is shown in (A) of FIG. 4, wherein one example of the bar code is shown on the top stage and the clock pulse of the clock pulse generator 50 is shown on the second top stage. As can be seen from the signal waveform (A) of FIG. 4, the output signal is intermittent and the lower peak level thereof corresponds to the color of the bar.

The sample hold circuit 303 connected in series to the amplifier 301 is comprised of an analog switch 303a, a capacitor 303b, an operational amplifier 303c, and resistors 303d and 303e. The analog switch 303a is connected to the sampling pulse generator 302 which generates a sampling pulse in response to the clock pulse. The frequency of the sampling pulse is equal to that of the clock pulse but the time width of the sampling pulse is much shorter than that of the clock pulse. The analog switch 303a closes only when the sampling pulse is applied, allowing only the lower peak level of the output signal of the amplifier 301 to be applied to the capacitor 303b therethrough. The capacitor 303b then holds this signal level until when the analog switch 303a closes again. The signal across the capacitor 303b is amplified by the operational amplifier 303c. The sample hold circuit 303, thus sampling and holding the intermittent output signal of the amplifier 301, produces at a point B the continuous output signal $b$, which is shown in (B-C) of FIG. 4. It must be noted that the output signal $b$, changes as the lower peak level of the output signal of the amplifier 301 changes.

The reshape circuit 305 connected in series to the sample hold circuit 303 is comprised of diodes 305a and 305b, capacitors 305c and 305d, resistor 305e, 305f and 305g and a comparator 305h. The diodes 305a and 305b are connected oppositely and parallelly with each other for increasing and decreasing the amplitude of the output signal applied from the sample hold circuit 303 by a constant amount. The suppressed signal is then delayed by the cooperation of the diodes 305a and 305b and a capacitor 305c. The signal $c$ appearing at a point C, across the capacitor 305c, is shown in (B-C) of FIG. 4 with the dotted line. The comparator 305h is applied with the signal $c$ and the signal $b$ at the respective non-inverting (+) and inverting (−) input terminals and produces at a point D the rectangular signal as shown in (D) of FIG. 4. The level of the rectangular signal becomes high when the suppressed signal $c$ prevails the signal $b$, whereas it becomes low when the latter prevails the former. The high and low levels of the rectangular signal are respectively indicative of the white and black bars. The time intervals $t_1-t_2$ and $t_2-t_3$ are approximately proportional to the wide bar, whereas the time intervals $t_3-t_4$, $t_4-t_5$ and $t_5-t_6$ are also approximately proportional to the narrow bar.

The abovedescribed signal processing is available enough on condition that the illumination light 10a projected on the card 80 is uniform. But attention must be paid to the fact that the illumination light 10a is likely to fluctuate, when the reflector lamp 10 is energized by the commercial a.c. electric power, making the correct signal processing impossible because of the superposing of the noise signal on the image signal. The noise-superposed output signal appearing at the point B of the sample hold circuit 303 is shown in (B') of FIG. 5 exemplarily, wherein noise signal component of comparatively low frequency is illustrated with the dotted line. This noise signal must be excluded from the output signal of the sample hold circuit 303 prior to the reshaping of the reshape circuit 305.

The low pass filter 304 which constitutes a negative feedback loop is incorporated in the analog amplifier 30 as shown in FIG. 3. The low pass filter 304, connected between the output stage of the sample hold circuit 303 and the input stage of the amplifier 301, is comprised of resistors 304a, 304b and 304c, a capacitor 304d and an operational amplifier 304e. The cut-off frequency of this filter is set to be lower than one tenth (28 KHz) of the clock pulse frequency (280 KHz) because the wide bar requires 10 clocks to be fully scanned in this embodiment. The frequency component of the signal appearing at the point B lower than the cut-off frequency is passed through the filter 304 but the frequency component thereof higher than the cut-off frequency is cut off. Therefore the noise signal of low frequency which is inverted appears at a point E of the filter 304 to be applied to the amplifier 301. The operational amplifier 301e, receiving the noise signal at the non-inverting input terminal (+) and the image signal at the inverting input terminal (−), subtracts the noise signal from the image signal to supply the sample hold circuit 303 with an output signal from which the noise signal is excluded. With the aid of the low pass filter 304, the sample hold circuit 303 produces at the point B the noise-excluded output signal b' as shown in (B'') of FIG. 5. The reshape circuit 305, comparing the signal b' with the signal c' of the point C, produces at the point D the rectangular signal as shown in (D') of FIG. 5 in the same manner as has been described with reference to FIG. 4. This rectangular signal also corresponds to both the color and the width of the bar.

The other type of filter may be employed as well to exclude the noise signal from the output signal of the sample hold circuit 303 as shown in FIG. 6, wherein the same reference numerals designate the same construction as in FIG. 3. According to the arrangement of FIG. 6 either a high pass filter 304' or a band pass filter 304' is connected in series between the sample hold circuit 303 and the reshape circuit 305. Both high pass and band pass filters 304' are available for cutting off the noise signal of low frequency resulting from the density fluctuation of the reflected light 10b.

The rectangular signal, the serial digital signal, produced from the analog amplifier 30 is applied to the analog-to-digital converter 40 to be converted into the parallel digital signal which is advantageous for the recognition of the scanned information. The detail of signal conversion of the converter 40 and information recognition of the signal processing unit 60 is not described herein, because it has been fully described in the patent application of Ser. No. 668,036 which is copending and has been assigned to the same assignee as the present invention.

Although the present invention has been described hereinabove with reference to one embodiment thereof, but it is not limited to the embodiment from the facts that the information can be recorded into other codes instead of the bar code and that the image sensor can be replaced by other sensors in a laser beam scanning system.

What is claimed is:

1. A method to optically recognize the information recorded on an object comprising the steps of:
    transferring an object on which at least one bar code is recorded, said bar code having parallel bar symbols in different width and light reflecting color;
    projecting a light beam onto said object to be reflected thereby;
    recieving a reflected light beam from said object by a plurality of optical element aligned to transverse said parallel bar symbols;
    sweeping said optical elements one by one in response to clock pulses of a fixed frequency, each of said optical elements generating an image signal, the peak signal level of which corresponds to the density of the reflected light beam;
    sampling repetitively the peak signal level of the image signal in timed relationship with the clock pulses;
    holding the peak signal level of the image signal sampled in said sampling step to generate an analog signal, the frequency and the signal level of which corresponds to the density of the reflected light beam;
    applying the analog signal to a low pass filter having a cut-off frequency lower than one preset in accordance with the widest bar symbol; and
    negatively feeding back a low frequency signal passed through said low pass filter onto the image signal, whereby a noise-excluded signal varying only with the width and the color of said bar symbols is generated from said holding step.

2. A method of claim 1 further comprising the steps of:
    shifting the signal level and the phase of the nosie-excluded signal by parallelly and oppositely connected diodes and by a capacitor, respectively, to generate a shift signal changing in proportional relation with the noise-excluded signal; and
    comparing the noise-excluded signal with the shift signal to generate a rectangular signal having a signal level and a time interval indicative of the color and the width of said bar symbols, respectively.

3. An apparatus to optically recognize the information recorded on an object comprising:
    a light source energized by the alternating current electric power for projecting a light onto an object on which a plurality of bar symbols are recorded parallelly in different light reflecting color;
    a clock generator for generating a clock pulse of a fixed frequency higher than that of the electric power;
    a sensor having a plurality of light-responsive elements connected to said clock generator to be swept one by one for scanning the density of a light reflected by said bar symbols, said sensor serially generating an image signal having a signal level corresponding to the scanned density;
    a filter, connected to said sensor, for excluding from the image signal a noise signal which includes the frequency of the electric power; and
    a reshape circuit, connected to receive a noise-excluded image signal, for reshaping the same into a rectangular signal having a signal level and a time interval indicative of the respective color and the width of said bar symbols, said reshape circuit including diodes connected parallelly and oppositely to each other for increasing and decreasing the signal level of the noise-excluded image signal by a constant level, a capacitor connected to said diodes for delaying the output signal of said diodes, and a comparator connected to compare the noise-excluded image signal with the output signal of said capacitor.

4. An apparatus of claim 3, wherein said filter includes a low pass filter having a cut-off frequency higher than that of the electric power but lower than that of the clock pulse and connected in a negative feedback path between said reshape circuit and said sensor.

5. An apparatus of claim 3, wherein said filter includes a high pass filter having a cut-off frequency higher than that of the electric power but lower than that of the clock pulse and connected in series between said sensor and said reshape circuit.

6. An apparatus of claim 3, wherein said filter includes a band pass filter connected in series between said sensor and said reshape circuit, said band pass filter having a lower cut-off frequency lower than that of the electric power and a higher cut-off frequency higher than that of the clock pulse.

7. An apparatus to optically recognize the information recorded on an object comprising:

a light source for supplying a light onto an object on which information is recorded in a different light reflecting color from that of said object;

a light responsive sensor, positioned to receive the light reflected by said object, for scanning the density of the reflected light in a predetermined straight direction at a constant scanning speed and serially generating an image signal which varies with the scanned density of the reflected light;

a filter, connected to receive the image signal, for excluding therefrom a noise signal having a frequency lower than a predetermined frequency over which the image signal should vary in accordance with the recorded information; and a reshape circuit, connected to receive an analog signal which is noise-excluded by said filter, for reshaping the same into a rectangular signal having at least two signal levels indicative of the color of said object and the infoemation respectively, said reshape circuit including diodes connected parallelly and oppositely to each other for increasing and decreasing the level of the analog signal by a constant level, a capacitor connected to said diodes for delaying the output signal of said diodes and a comparator connected to compare the analog signal with the output signal of said capacitor.

8. An apparatus of claim 7, wherein said filter includes a low pass filter, connected in parallel with a path through which the image signal is passed from said sensor to said reshape circuit, for negatively feeding back the noise signal therethrough.

* * * * *